United States Patent
Winkler (10) Patent No.: US 11,857,916 B2
(45) Date of Patent: Jan. 2, 2024

(54) DEVICE AND A PROCESS FOR SEPARATING METHANE FROM A GAS MIXTURE CONTAINING METHANE, CARBON DIOXIDE AND HYDROGEN SULFIDE

(71) Applicant: EVONIK OPERATIONS GMBH, Essen (DE)

(72) Inventor: Florian Winkler, Thalgau (AT)

(73) Assignee: Evonik Operations GmbH, Essen (DE)

( * ) Notice: Subject to any disclaimer, the term of this patent is extended or adjusted under 35 U.S.C. 154(b) by 263 days.

(21) Appl. No.: 17/281,962

(22) PCT Filed: Sep. 18, 2019

(86) PCT No.: PCT/EP2019/075001
§ 371 (c)(1),
(2) Date: Mar. 31, 2021

(87) PCT Pub. No.: WO2020/069868
PCT Pub. Date: Apr. 9, 2020

(65) Prior Publication Data
US 2021/0339189 A1    Nov. 4, 2021

(30) Foreign Application Priority Data
Oct. 2, 2018   (EP) .................... 18198221

(51) Int. Cl.
*B01D 53/22* (2006.01)
*B01D 5/00* (2006.01)
*B01D 53/86* (2006.01)

(52) U.S. Cl.
CPC ......... *B01D 53/229* (2013.01); *B01D 5/0036* (2013.01); *B01D 53/226* (2013.01);
(Continued)

(58) Field of Classification Search
None
See application file for complete search history.

(56) References Cited

U.S. PATENT DOCUMENTS

| | | |
|---|---|---|
| 5,053,058 A | 10/1991 | Mitariten |
| 5,727,903 A | 3/1998 | Borray et al. |

(Continued)

FOREIGN PATENT DOCUMENTS

| | | |
|---|---|---|
| CN | 205420305 U | 8/2016 |
| EP | 1 585 181 | 10/2005 |

(Continued)

OTHER PUBLICATIONS

International Search Report for international application PCT/EP2020/051497, filed Jan. 22, 2020; corresponding to copending U.S. Appl. No. 17/427,555.

(Continued)

*Primary Examiner* — Jason M Greene
(74) *Attorney, Agent, or Firm* — Law Office of: Michael A. Sanzo, LLC (57) ABSTRACT

In a device for separating methane from a gas mixture containing methane, carbon dioxide and hydrogen sulfide, comprising a gas compressor, two or three membrane separation stages downstream of the compressor and a hydrogen sulfide adsorber, comprising a bed of activated carbon having catalytic activity for oxidizing hydrogen sulfide with oxygen, arranged upstream of the membrane separation stages, oxygen content and relative humidity can be adjusted for optimum adsorption capacity of the hydrogen sulfide adsorber by recycling permeate from the second membrane separation stage, which receives the retentate of the first membrane separation stage, to a point upstream of the hydrogen sulfide adsorber.

20 Claims, 2 Drawing Sheets

(52) U.S. Cl.
CPC ......... *B01D 53/227* (2013.01); *B01D 53/864* (2013.01); *B01D 53/8618* (2013.01); *B01D 2253/25* (2013.01); *B01D 2256/245* (2013.01); *B01D 2257/304* (2013.01); *B01D 2257/504* (2013.01); *B01D 2258/05* (2013.01)

(56) References Cited

U.S. PATENT DOCUMENTS

| | | | |
|---|---|---|---|
| 6,197,090 | B1 | 3/2001 | Yamashita et al. |
| 6,572,678 | B1 | 6/2003 | Wijmans et al. |
| 8,568,512 | B2 | 10/2013 | Siegel et al. |
| 8,999,036 | B2 | 4/2015 | Pierce |
| 8,999,038 | B2 | 4/2015 | Ungerank et al. |
| 9,005,335 | B2 | 4/2015 | Baker et al. |
| 9,314,735 | B2 | 4/2016 | Balster et al. |
| 9,469,048 | B2 | 10/2016 | Ungerank et al. |
| 9,713,791 | B2 | 7/2017 | Priske et al. |
| 9,770,687 | B2 | 9/2017 | Ungerank et al. |
| 9,873,093 | B2 | 1/2018 | Visser et al. |
| 9,988,326 | B2 | 6/2018 | Paget et al. |
| 10,040,036 | B2 | 8/2018 | Ungerank et al. |
| 10,118,136 | B2 | 11/2018 | Ungerank et al. |
| 10,456,750 | B2 | 10/2019 | Visser et al. |
| 10,471,380 | B2 | 11/2019 | Priske |
| 10,905,995 | B2 | 2/2021 | Prince et al. |
| 10,933,378 | B2 | 3/2021 | Visser et al. |
| 11,498,026 | B2 | 11/2022 | Wu et al. |
| 2007/0113736 | A1* | 5/2007 | Bandosz ............ B01D 53/8612 95/139 |
| 2007/0125537 | A1 | 6/2007 | Lokhandwala et al. |
| 2010/0288701 | A1 | 11/2010 | Zhou et al. |
| 2012/0000355 | A1 | 1/2012 | Sharma et al. |
| 2014/0137735 | A1* | 5/2014 | Bhandari ............ B01D 69/087 95/55 |
| 2014/0241968 | A1* | 8/2014 | Wennergren ......... B01D 53/025 585/830 |
| 2015/0336046 | A1 | 11/2015 | Ungerank et al. |
| 2016/0317981 | A1 | 11/2016 | Ungerank et al. |
| 2017/0320009 | A1 | 11/2017 | Hirata et al. |
| 2018/0099251 | A1 | 4/2018 | Visser et al. |
| 2018/0221824 | A1 | 8/2018 | Visser et al. |
| 2019/0001263 | A1* | 1/2019 | Prince .................. B01D 53/228 |
| 2020/0316516 | A1 | 10/2020 | Wu et al. |
| 2021/0363463 | A1 | 11/2021 | Xie et al. |
| 2021/0394125 | A1 | 12/2021 | Peters et al. |
| 2022/0134274 | A1 | 5/2022 | Pedersen et al. |

FOREIGN PATENT DOCUMENTS

| | | |
|---|---|---|
| GB | 2 010 794 | 7/1979 |
| GB | 2534383 | 7/2016 |
| JP | 2018086620 | 6/2018 |
| KR | 10-1840337 | 3/2018 |
| KR | 10-1840340 | 3/2018 |
| KR | 10-1840343 | 3/2018 |
| KR | 10-1863058 | 6/2018 |
| WO | WO 2014/183977 | 11/2014 |
| WO | WO 2016/198450 | 12/2016 |
| WO | WO 2019/165597 | 6/2019 |
| WO | WO 2022/012944 | 1/2022 |
| WO | WO 2023/011919 | 2/2023 |

OTHER PUBLICATIONS

Written Opinion of the International Searching Authority for international application PCT/EP2020/051497, filed Jan. 22, 2020; corresponding to copending U.S. Appl. No. 17/427,555.

International Preliminary Report on Patentability for international application PCT/EP2020/051497, filed Jan. 22, 2020 corresponding to copending U.S. Appl. No. 17/427,555.

U.S. Appl. No. 17/427,555, filed Jul. 30, 2021, Pedersen.

International Search Report for corresponding international application PCT/EP2019/075001 filed Sep. 18, 2019.

Written Opinion of the International Searching Authority for corresponding international application PCT/EP2019/075001 filed Sep. 18, 2019.

International Preliminary Report on Patentability for corresponding international application PCT/EP2019/075001 filed Sep. 18, 2019.

European Search Report corresponding European application EP 18 19 8221, filed Oct. 2, 2018.

Alqaheem, et al., "Polymeric Gas-Separation Membranes for Petroleum Refining," *International Journal of Polymer Science* 2017:1-19 (Jan. 2017).

Castrillon, et al., "$CO_2$ and $H_2S$ Removal from $CH_4$-Rich Streams by Adsorption on Activated Carbons Modified with $K_2CO_3$, or $Fe_2O_3$," *Energy & Fuels* 30(11):9596-9604 (Oct. 2016).

Chiang, et al., "Effect of Relative Humidity of Adsorption Breakthrough of $CO_2$ on Activated Carbon Fibers," *Materials* 10(11):1-14 (Nov. 2017).

Leuch, et al., "Hydrogen Sulfide Adsorption and Oxidation onto Activated Carbon Cloths: Applications to Odorous Gaseous Emission Treatments," *Langmuir* 19(26):10869-10877 (Dec. 2003).

Yin, et al., "Effects of temperature and relative humidity on the methane permeability rate of biogas storage membranes," *International Journal of Green Energy* 13(9):951-956 (Jul. 2016).

U.S. Appl. No. 15/748,183, filed Jan. 28, 2018, US-2018/0221824 A1, Aug. 9, 2018, Visser.

U.S. Appl. No. 16/305,575, filed Nov. 29, 2018, US-2020/0316516 A1, Oct. 8, 2020, Wu.

U.S. Appl. No. 17/348,747, filed Jun. 15, 2021, US-2021/0394125 A1, Dec. 23, 2021, Peters.

International Search Report for PCT/EP2021/068142 filed Jul. 1, 2021, corresponding to copending U.S. Appl. No. 18/015,866.

Written Opinion of the International Searching Authority for PCT/EP2021/068142 filed Jul. 1, 2021, corresponding to copending U.S. Appl. No. 18/015,866.

International Preliminary Report on Patentability for PCT/EP2021/068142 filed Jul. 1, 2021, corresponding to copending U.S. Appl. No. 18/015,866.

European Search Report and Search Opinion for EP 20185597 filed Jul. 14, 2020, corresponding to copending U.S. Appl. No. 18/015,866.

Chen, et al., "Membrane gas separation technologies for biogass upgrading," *RSC Advances* 5(31):24399-24448 (Jan. 2015).

Falbo, et al., "Polyimide hollow fiber membranes for $CO_2$ separation from wet gas mixtures," *Brazilian Journal of Chemical Engineering* 31(4):1023-1034 (Dec. 2014).

Scholz, et al., "Modeling Gas Permeation by Linking Nonideal Effects," *Ind. Eng. Chem. Res.* 52(3):1079-1088 (Jan. 2013).

Shin, et al., "Biogas separation using a membrane gas separator: Focus on $CO_2$ upgrading without $CH_4$ loss," *Process Safety and Environmental Protection* 129:348-358 (Jul. 2019).

U.S. Appl. No. 18/015,866, filed Jan. 12, 2023, Priske.

* cited by examiner

DEVICE AND A PROCESS FOR SEPARATING METHANE FROM A GAS MIXTURE CONTAINING METHANE, CARBON DIOXIDE AND HYDROGEN SULFIDE

CROSS REFERENCE TO RELATED APPLICATIONS

The present application is US national stage of international application PCT/EP2019/075001, which had an international filing date of Sep. 18, 2019 and which claims priority to EP 18198221.6 filed in Europe on Oct. 2, 2018. These prior applications are hereby incorporated by reference herein in their entirety.

FIELD OF THE INVENTION

The invention is directed at a device and a process for separating methane from a gas mixture containing methane, carbon dioxide and hydrogen sulfide, which improve removal of hydrogen sulfide with activated carbon.

BACKGROUND OF THE INVENTION

Gas mixtures resulting from anaerobic fermentation, such as biogas from an anaerobic digester or a landfill gas, usually comprise methane and carbon dioxide as the major components and hydrogen sulfide as a critical contaminant which can lead to severe corrosion of metal equipment.

The same is true for many qualities of natural gas.

Separating methane from such gas mixtures in a quality suitable for feeding the methane into a gas distribution grid is of commercial interest and requires separating methane with a low content of hydrogen sulfide from the gas mixture. Membrane processes are advantageous for separating methane from carbon dioxide as they do not require an absorbent for carbon dioxide and can be operated with low energy consumption. A suitable three stage membrane process for separating methane from carbon dioxide is known from WO 2012/000727.

Adsorbers with a bed of activated carbon are commonly used to remove hydrogen sulfide from biogas before further use or processing. The biogas is usually cooled to condense part of the moisture contained in the biogas and then reheated to reduce the relative humidity before it is passed to the activated carbon adsorber.

U.S. Pat. No. 5,727,903 discloses a process for purification of raw landfill gas which comprises drying and compressing the gas, passing it over an activated carbon guard bed to remove volatile organic compounds and compressor oil and separating methane from the gas in a two stage membrane separation. Part of the permeate from the second membrane separation stage is recycled to a point upstream of the compressor.

U.S. Pat. No. 8,999,036 discloses a method for producing a natural gas equivalent from biogas where the biogas is dried and compressed and the compressed gas is passed through a sulfur compounds removal unit where sulfur compounds are removed with commercial iron oxide absorbents such as SulfaTreat or Sulfa-Rite. The gas is then further dried and passed to a VOC removal device filled with activated carbon before it is subjected to a membrane separation for separating methane. The membrane separation can be operated with two stages, as shown in FIG. 2, where permeate from the second stage is recycled to a point upstream of the compressor.

SUMMARY OF THE INVENTION

The inventors of the present invention have now found that recycle gas streams from a two or three stage membrane separation can be used for adjusting the oxygen content and the relative humidity of a biogas or another gas, containing methane, carbon dioxide and hydrogen sulfide, to provide optimum adsorption capacity of a hydrogen sulfide adsorber containing activated carbon, which has catalytic activity for oxidizing hydrogen sulfide with oxygen, requiring no or little extra equipment and energy consumption for this adjustment.

Subject of the invention is therefore a device for separating methane from a gas mixture containing methane, carbon dioxide and hydrogen sulfide, said device comprising a gas compressor (1);
a feed line (2) for feeding said gas mixture to said gas compressor (1);
a first membrane separation stage (3) downstream of said gas compressor (1), comprising a gas separation membrane having higher permeability for carbon dioxide than for methane, providing a first retentate (4) and a first permeate (5);
a second membrane separation stage (6), connected to said first membrane separation stage (3) to receive the first retentate (4) as feed, said second membrane separation stage (6) comprising a gas separation membrane having higher permeability for carbon dioxide than for methane, providing a second retentate (7) as a product gas enriched in methane and a second permeate (8);
optionally a third membrane separation stage (9), connected to said first membrane separation stage (3) to receive the first permeate (5) as feed, said third membrane separation stage (9) comprising a gas separation membrane having higher permeability for carbon dioxide than for methane, providing a third retentate (10) and a third permeate (11);
a recycle conduit (12) connected to a recycle feed point (13) on said feed line (2) upstream of said gas compressor (1), said recycle conduit (12) being connected to said second membrane separation stage (6) to receive said second permeate (8) or, provided that the optional third membrane separation stage (9) is present, connected to said third membrane separation stage (9) to receive said third retentate (10) or to both said second membrane separation stage (6) and said third membrane separation stage (9) to receive said second permeate (8) and said third retentate (10), and
at least one hydrogen sulfide adsorber (14) comprising a bed of activated carbon having catalytic activity for oxidizing hydrogen sulfide with oxygen, said hydrogen sulfide adsorber (14) being arranged between said recycle feed point (13) and said first membrane separation stage (3).

A further subject of the invention is a process for separating methane from a gas mixture containing methane, carbon dioxide and hydrogen sulfide, which process comprises feeding said gas mixture to the feed line of a device of the invention, withdrawing retentate from the second membrane separation stage as a product gas enriched in methane.

DETAILED DESCRIPTION OF THE INVENTION

The device of the invention comprises a gas compressor (1) and a feed line (2) for feeding a gas mixture containing methane, carbon dioxide and hydrogen sulfide to the gas compressor. Any gas compressor known to be suitable for compressing mixtures containing methane and carbon dioxide may be used, such as a turbo compressor, a piston compressor or preferably a screw compressor. The screw compressor may be a dry running compressor or a fluid-cooled compressor cooled with water or oil. When an oil cooled compressor is used, the device preferably also contains a droplet separator downstream of the compressor to prevent oil droplets from entering a membrane separation stage.

The device of the invention also comprises a first membrane separation stage (3) downstream of the gas compressor (1). The first membrane separation stage comprises a gas separation membrane which has higher permeability for carbon dioxide than for methane and provides a first retentate (4) and a first permeate (5). The term permeate here refers to a gas mixture comprising the gas components of the gas mixture fed to the membrane separation stage which have passed the gas separation membrane due to the difference in partial pressure across the membrane. The term retentate refers to the gas mixture which remains after the gas components have passed the gas separation membrane. The permeate may additionally comprise a sweep gas, if a sweep gas is introduced on the side of the gas separation membrane opposite to the side where the gas mixture is fed. Since the gas separation membrane has higher permeability for carbon dioxide than for methane, the permeate will have a higher molar ratio of carbon dioxide to methane than the gas mixture fed to the first membrane separation stage, i.e. it will be enriched in carbon dioxide, and the retentate will have a higher molar ratio of methane to carbon dioxide than the gas mixture fed to the first membrane separation stage, i.e. it will be enriched in methane.

Suitable membranes which have higher permeability for carbon dioxide than for methane are known from the prior art. In general, membranes containing a separation layer of a glassy polymer, i.e. a polymer having a glass transition point at a temperature above the operating temperature of the membrane separation stage, will provide higher permeability for carbon dioxide than for methane. The glassy polymer may be a polyetherimide, a polycarbonate, a polyamide, a polybenzoxazole, a polybenzimidazole, a polysulfone or a polyimide and the gas separation membrane preferably comprises at least 80% by weight of a polyimide or a mixture of polyimides.

In a preferred embodiment, the gas separation membrane comprises at least 50% by weight of a polyimide prepared by reacting a dianhydride selected from 3,4,3',4'-benzophenonetetracarboxylic dianhydride, 1,2,4,5-benzenetetracarboxylic dianhydride, 3,4,3',4'-biphenyltetracarboxylic dianhydride, oxydiphthalic dianhydride, sulphonyldiphthalic dianhydride, 1,1,1,3,3,3-hexafluoro-2,2-propylidenediphthalic dianhydride and mixtures thereof with a diisocyanate selected from 2,4-tolylene diisocyanate, 2,6-tolylene diisocyanate, 4,4'-methylenediphenyl diisocyanate, 2,4,6-trimethyl-1,3-phenylene diisocyanate, 2,3,5,6-tetramethyl-1,4-phenylene diisocyanate and mixtures thereof. The dianhydride is preferably 3,4,3',4'-benzophenonetetracarboxylic dianhydride or a mixture of 3,4,3',4'-benzophenonetetracarboxylic dianhydride and 1,2,4,5-benzenetetracarboxylic dianhydride. The diisocyanate is preferably a mixture of 2,4-tolylene diisocyanate and 2,6-tolylene diisocyanate or a mixture of 2,4-tolylene diisocyanate, 2,6-tolylene diisocyanate and 4,4'-methylenediphenyl diisocyanate. Suitable polyimides of this type are commercially available from Evonik Fibres GmbH under the trade name P84® type 70, which has CAS number 9046-51-9 and is a polyimide prepared from 3,4,3',4'-benzophenonetetracarboxylic dianhydride and a mixture of 64 mol % 2,4-tolylene diisocyanate, 16 mol % 2,6-tolylene diisocyanate and 20 mol % 4,4'-methylenediphenyl diisocyanate, and under the trade name P84® HT, which has CAS number 134119-41-8 and is a polyimide prepared from a mixture of 60 mol % 3,4,3',4'-benzophenonetetracarboxylic dianhydride and 40 mol % 1,2,4,5-benzenetetracarboxylic dianhydride and a mixture of 80 mol % 2,4-tolylene diisocyanate and 20 mol % 2,6-tolylene diisocyanate. The gas separation membranes of this embodiment have preferably been heat treated in an inert atmosphere as described in WO 2014/202324 A1 to improve their long term stability in the process of the invention.

In another preferred embodiment, the gas separation membrane comprises at least 50% by weight of a block copolyimide as described in WO 2015/091122 on page 6, line 20 to page 16, line 4. The block copolyimide preferably comprises at least 90% by weight of polyimide blocks having a block length of from 5 to 1000, preferably from 5 to 200.

The gas separation membrane may be flat membrane or a hollow fiber membrane and is preferably an asymmetrical hollow fiber membrane comprising a dense polyimide layer on a porous support. The term "dense layer" here refers to a layer which comprises essentially no macropores extending through the layer and the term "porous support" here refers to a support material having macropores extending through the support. The asymmetrical hollow fiber membrane can be prepared by coating a porous hollow fiber with a polyimide to form a dense polyimide layer on the support. In a preferred embodiment, the asymmetrical hollow fiber membrane is a membrane prepared in a phase inversion process by spinning with an annular two component spinning nozzle, passing a solution of a polyimide through the annular opening and a liquid containing a non-solvent for the polyimide through the central opening.

The gas separation membrane preferably comprises a dense separation layer of a glassy polymer coated with a dense layer of a rubbery polymer which rubbery polymer has higher gas permeability than the glassy polymer. The preferred gas separation membranes comprising a polyimide separation layer are preferably coated with a polydimethylsiloxane elastomer.

When the gas separation membrane is a flat membrane, the first membrane separation stage preferably comprises one or several spiral wound membrane modules containing the flat membranes and when the gas separation membrane is a hollow fiber membrane the first membrane separation stage preferably comprises one or several membrane modules containing a bundle of hollow fiber membranes. The first membrane separation stage may comprise several membrane modules arranged in parallel and may also comprise several membrane modules arranged in series, wherein in a series of membrane modules the retentate provided by a membrane module is passed as feed to the membrane module subsequent in the series of membrane modules, the last membrane module of the series providing the retentate of the membrane separation stage, and the permeates of all membrane modules within a series are combined to provide the permeate of the membrane separation stage. When the first membrane separation stage comprises several membrane modules arranged in series, the membrane modules are preferably removable membrane cartridges arranged in series as a chain of cartridges in a common pressure vessel and connected to each other by a central permeate collecting tube, as described in detail in WO 2016/198450 A1.

The first membrane separation stage preferably contains gas separation membranes having a pure gas selectivity of carbon dioxide over methane, determined at 20° C., of at least 20, preferably from 30 to 120 and more preferably from 40 to 100.

Suitable membrane modules and membrane cartridges containing hollow fiber polyimide membranes with a pure gas selectivity of carbon dioxide over methane of more than 20 are commercially available from Evonik Fibres GmbH under the trade name SEPURAN® Green.

The membrane area of the gas separation membranes in the first membrane separation stage is preferably chosen to allow for transferring from 50 to 95% of the carbon dioxide contained in the feed stream fed to the first membrane separation stage to the permeate stream provided by the first membrane separation stage. The membrane area needed for allowing this fraction of carbon dioxide to permeate in the first membrane separation stage will depend on the flow rate and composition of the feed stream, the pressures on the feed and the permeate side applied in operating the first membrane separation stage and on the gas permeance and the selectivity of the membrane at the temperature used in operating the first membrane separation stage.

The device of the invention preferably also comprises a dehumidifier upstream of the first membrane separation stage to prevent water contained in the gas stream fed to the membrane separation stage from condensing in the first membrane separation stage or a subsequent membrane separation stage of the device. The dehumidifier is preferably arranged between gas compressor (1) and the first membrane separation stage, and preferably dehumidifies the compressed gas by cooling, condensing water from the cooled gas in a condenser and reheating the gas, with the reheating preferably carried out by the compressed gas in a counter current heat exchanger.

The device of the invention further comprises a second membrane separation stage (6) which is connected to the first membrane separation stage (3) to receive the first retentate (4) as feed. The second membrane separation stage (6) comprises a gas separation membrane which has higher permeability for carbon dioxide than for methane and provides a second retentate (7) as a product gas enriched in methane and a second permeate (8). The second membrane separation stage may comprise the same gas separation membrane as the first membrane separation stage or may comprise a different gas separation membrane and preferably comprises the same gas separation membrane as the first membrane separation stage. The same arrangements of gas separation membranes in modules or cartridges as described above for the first membrane separation stage may be used in the second membrane separation stage.

The total membrane area of the gas separation membranes in the second membrane separation stage is preferably chosen to reduce the carbon dioxide content in the second retentate below a desired limit by transferring sufficient carbon dioxide contained in the feed stream fed to the second membrane separation stage to the second permeate.

The device of the invention preferably comprises an additional third membrane separation stage (9) which is connected to the first membrane separation stage (3) to receive the first permeate (5) as feed. The third membrane separation stage (9) comprises a gas separation membrane having higher permeability for carbon dioxide than for methane, providing a third retentate (10) and a third permeate (11). The third membrane separation stage may comprise the same gas separation membrane as the first membrane separation stage or may comprise a different gas separation membrane and preferably comprises the same gas separation membrane as the first membrane separation stage. The same arrangements of gas separation membranes in modules or cartridges as described above for the first membrane separation stage may be used in the third membrane separation stage.

An additional third membrane separation stage (9) can provide a third permeate (11) with a low content of methane that can be discharged to the atmosphere without further treatment. When the third retentate (10) is recycled to the feed of the first membrane separation stage, the additional third membrane separation stage will also reduce methane losses and increase methane recovery with the second retentate (7).

The device of the invention may additionally comprise a blower or a compressor between the first membrane separation stage and the third membrane separation stage, increasing the pressure of the first permeate (5) for feeding it to the third membrane separation stage. When such a blower or compressor is used, less membrane area is needed in the third membrane separation stage for achieving the same separation result, but additional energy is needed for the pressure increase.

The device of the invention comprises a recycle conduit (12) connected to a recycle feed point (13) on the feed line (2) upstream of the gas compressor (1). If the optional third membrane separation stage (9) is not present, the recycle conduit (12) is connected to the second membrane separation stage (6) to receive the second permeate (8). If the optional third membrane separation stage (9) is present, the recycle conduit (12) is connected to the second membrane separation stage (6) to receive the second permeate (8) or is connected to the third membrane separation stage (9) to receive said third retentate (10) or is preferably connected to both said second membrane separation stage (6) and said third membrane separation stage (9) to receive said second permeate (8) and said third retentate (10).

The device of the invention also comprises at least one hydrogen sulfide adsorber (14) which comprises a bed of activated carbon having catalytic activity for oxidizing hydrogen sulfide with oxygen. The hydrogen sulfide adsorber (14) is arranged between the recycle feed point (13) and the first membrane separation stage (3) and may be arranged either upstream or downstream of gas compressor (1).

An activated carbon having catalytic activity for oxidizing hydrogen sulfide with oxygen is capable of catalyzing oxidation of hydrogen sulfide to elemental sulfur through intermediate stages of hydrogen disulfide and hydrogen polysulfides according to the following stochiometry:

$$8H_2S + 4O_2 \rightarrow S_8 + 8H_2O$$

Catalytic activity for oxidizing hydrogen sulfide with oxygen can be provided to an activated carbon by introducing iodide, iodine or a basic compound into the activated carbon. Such introducing may be through doping the activated carbon by adding iodine, an iodide salt, an iodine precursor or a non-volatile base to a carbon-containing precursor material and carbonizing the precursor material to activated carbon after this addition. Alternatively, such introducing may be by impregnating an activated carbon with an iodine, an iodide salt, hydrogen iodide, an iodine precursor or a basic compound. Suitable basic compounds are alkali metal hydroxides, alkali metal carbonates, alkaline earth metal oxides, alkaline earth metal hydroxides and alkaline earth metal carbonates, in particular sodium hydroxide, sodium carbonate, potassium hydroxide, potassium carbonate, calcium oxide, calcium hydroxide and calcium carbonate. Catalytic activity for oxidizing hydrogen sulfide with oxygen can also be provided by carbonizing bituminous coal to an activated carbon at specific reaction conditions. Hydrogen sulfide adsorbers which comprises a bed of activated carbon are known from the prior art and are commercially available. Activated carbon having catalytic activity for oxidizing hydrogen sulfide with oxygen is also commercially available, for example from NECATEC AG under the trade name NECA|Active® sulfo or from Donau Carbon GmbH under the trade names Desorex® K 43 J (impregnated with potassium iodide), Desorex® G 50 (impregnated with potassium hydroxide), Desorex® K 43 BG (impregnated with alkaline earth carbonate) and Desorex® G 70. An activated carbon having catalytic activity for oxidizing hydrogen sulfide with oxygen will in general also adsorb mercaptans contained in the gas mixture in addition to hydrogen sulfide by cooxidizing them with hydrogen sulfide to give alkylpolysulfides.

Hydrogen sulfide adsorbers comprising a bed of activated carbon having catalytic activity for oxidizing hydrogen sulfide with oxygen have been used in the prior art for removing hydrogen sulfide from biogas prepared by anaerobic fermentation. Anaerobic fermentation is often carried out with controlled feeding of oxygen to the fermentation to reduce formation of hydrogen sulfide, which provides a biogas containing some oxygen. However, the oxygen concentration of the biogas resulting from such process is in often too low to provide effective removal of hydrogen sulfide in the adsorber. Prior art processes therefore usually add more oxygen or air to the biogas upstream of the absorber in order to achieve complete hydrogen sulfide removal and to make use of the maximum absorption capacity of the hydrogen sulfide adsorber. However, this has the disadvantage of increasing the nitrogen content of the biogas if air is added which leads to a reduced methane content of the methane enriched product gas. Furthermore, such addition of oxygen or air to the biogas carries risks, because adding too much oxygen or air may lead to explosive gas mixtures and adding too little oxygen may lead to hydrogen sulfide accumulation in the adsorber which can lead to a runaway reaction if more oxygen is added to the biogas at a later time. A further disadvantage of prior art processes is the need for drying the biogas upstream of the hydrogen sulfide adsorber, because biogas coming from anaerobic fermentation usually has a moisture content of close to 100% relative humidity, whereas a hydrogen sulfide adsorber comprising a bed of activated carbon should be operated ata relative humidity of the biogas of less than 80% to prevent pore condensation of water which lowers the rate of hydrogen sulfide adsorption.

The device of the invention, having a recycle conduit (12) connected to a recycle feed point (13) on the feed line (2) upstream of the hydrogen sulfide adsorber (14), can overcome these disadvantages of the prior art. When the gas mixture fed to the device contains oxygen, the oxygen will be enriched in the second permeate (8) and the third retentate (10) compared to the original gas mixture and recycling of one or both of these streams will increase the oxygen content of the stream entering the hydrogen sulfide adsorber (14). Optimum hydrogen sulfide removal by the adsorber (14) can then be achieved without adding air or oxygen to the biogas or adding less than in prior art processes. When the device of the invention contains an additional dehumidifier between the gas compressor (1) and the first membrane separation stage (3), the second permeate (8) and the third retentate (10) will have a low water content and recycling one or both of these streams to a recycle feed point (13) upstream of the hydrogen sulfide adsorber (14) can lower the relative humidity of the gas stream entering the hydrogen sulfide adsorber (14) to a value providing optimum hydrogen sulfide removal by the adsorber (14) without drying the biogas upstream of the hydrogen sulfide adsorber.

In a preferred embodiment of the device of the invention, the hydrogen sulfide adsorber (14) is arranged upstream of gas compressor (1), i.e. arranged between the recycle feed point (13) and the gas compressor (1). This prevents corrosion by hydrogen sulfide in the gas compressor. When an oil cooled gas compressor is used, this also prevents deterioration of the oil by reaction of hydrogen sulfide or mercaptans with components of the oil.

Figure 1:
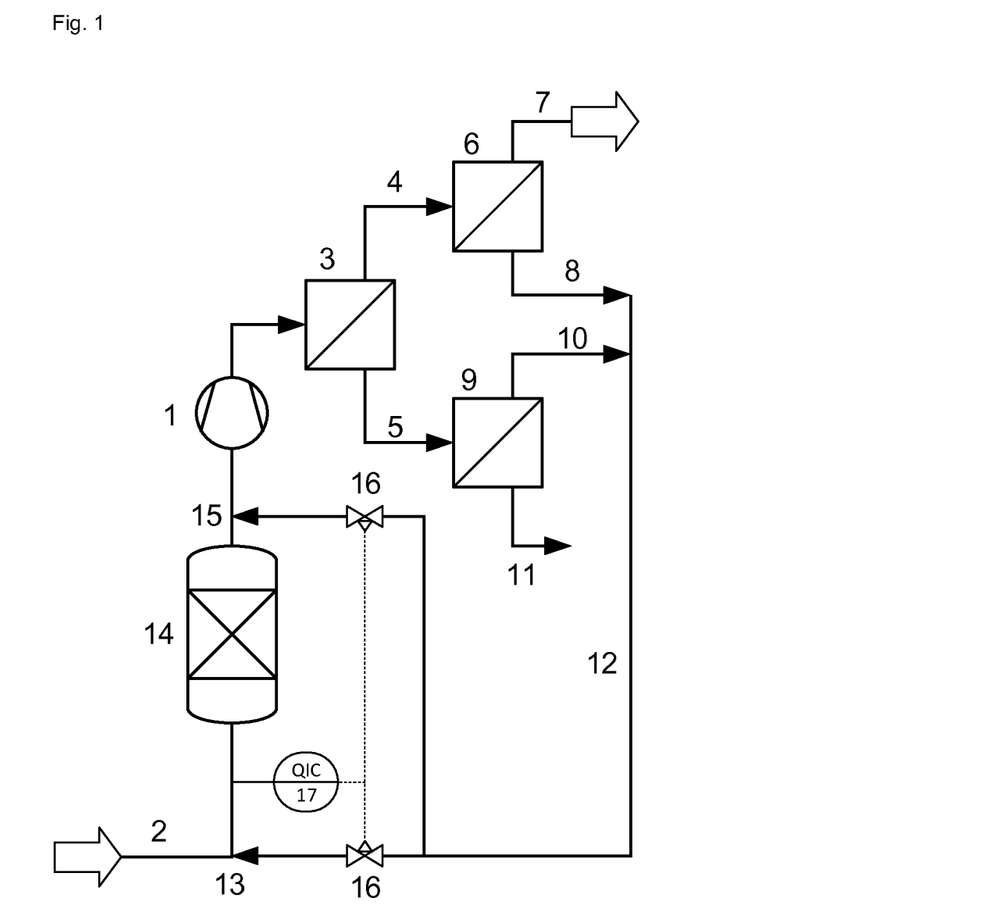
FIG. 1 shows an embodiment with three membrane separation stages, a hydrogen sulfide adsorber (14) arranged upstream of the gas compressor (1), an additional recycle feed point, an oxygen concentration measurement on the feed line between the recycle feed point and the hydrogen sulfide adsorber, and two control valves, where the oxygen concentration in the gas fed to the hydrogen sulfide adsorber is maintained within a preset range.

In this preferred embodiment, the recycle conduit (12) preferably comprises an additional connection to an additional recycle feed point (15) located between the hydrogen sulfide adsorber (14) and the gas compressor (1). The recycle conduit (12) then also comprises at least one control valve (16) for controlling the fraction of recycled gas being passed to recycle feed point (13) and additional recycle feed point (15). Preferably, two control valves (16) are used as shown in FIG. 1, one in the conduit to recycle feed point (13) and one in the conduit to additional recycle feed point (15). The additional recycle feed point (15) and control valve(s) (16) allow for adjusting the composition of the gas stream entering hydrogen sulfide adsorber (14) by changing the fraction of recycled gas which is passed to recycle feed point (13) upstream of the adsorber.

In a further preferred embodiment, the device of the invention comprises an oxygen concentration measurement (17) on feed line (2) between the recycle feed point (13) and the hydrogen sulfide adsorber (14) or between the hydrogen sulfide adsorber (14) and the additional recycle feed point (15) or at both locations, and a controller which is configured to operate control valve(s) (16) to maintain the oxygen concentration within a preset range. Any device known from the prior art to be suitable for determining an oxygen concentration in a gas mixture containing methane, carbon dioxide and hydrogen sulfide may be used in this embodiment. When the oxygen concentration measurement (17) is arranged between the recycle feed point (13) and the hydrogen sulfide adsorber (14), the controller is preferably configured to maintain the oxygen concentration within a range known to provide high rates of oxidation of hydrogen sulfide on the activated carbon. Such suitable range for the oxygen concentration can be determined experimentally or can be obtained form the manufacturer of the activated carbon. When the oxygen concentration measurement (17) is arranged between the hydrogen sulfide adsorber (14) and the additional recycle feed point (15), the controller is preferably configured to maintain a minimum oxygen concentration known to prevent accumulation of non-reacted hydrogen sulfide in the hydrogen sulfide adsorber (14). Such suitable minimum concentration can be determined experimentally, for example by measuring the amounts of hydrogen sulfide and oxygen entering and leaving the adsorber and calculating the conversion of hydrogen sulfide by reaction with oxygen using the stoichiometry of the reaction equation given above.

In another further preferred embodiment, the device of the invention comprises a measurement of relative humidity on feed line (2) between the recycle feed point (13) and the hydrogen sulfide adsorber (14) or between the hydrogen sulfide adsorber (14) and the additional recycle feed point (15), and a controller which is configured to operate control valve(s) (16) to maintain the relative humidity within a preset range. Any device known from the prior art to be suitable for determining relative humidity of a gas mixture containing methane, carbon dioxide and hydrogen sulfide may be used in this embodiment. The controller is preferably configured to maintain the relative humidity within a range known to provide high rates of oxidation of hydrogen sulfide on the activated carbon. A suitable range for the relative humidity can be determined experimentally or can be obtained form the manufacturer of the activated carbon. Controlling relative humidity of the gas may be combined with controlling oxygen concentration so as to maintain both parameters within the ranges providing optimum performance of the hydrogen sulfide adsorber (14).

When the device of the invention comprises a hydrogen sulfide adsorber (14) upstream of gas compressor (1), it preferably comprises an additional adsorber containing activated carbon between compressor (1) and the first membrane separation stage (3) for absorbing volatile organic compounds (VOC) that could condense in one of the membrane separation stages. The activated carbon in this additional adsorber need not have catalytic activity for oxidizing hydrogen sulfide with oxygen and can be optimized for VOC removal.

Figure 2:
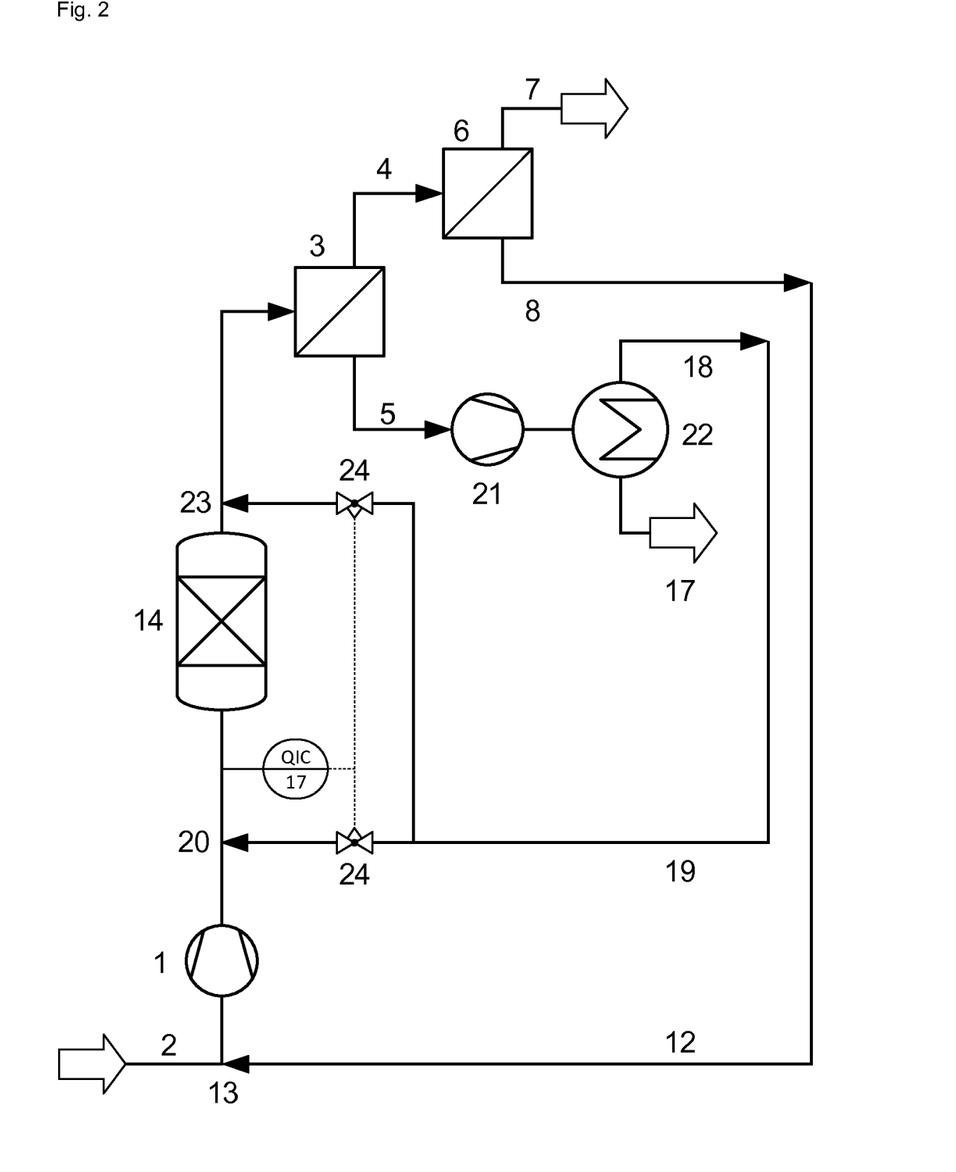
FIG. 2 shows an embodiment with two membrane separation stages and a carbon dioxide condensation stage where the hydrogen sulfide adsorber (14) is arranged downstream of the gas compressor (1).

In another embodiment, the device of the invention comprises a carbon dioxide condensation stage as an alternative to the optional third membrane separation stage. The carbon dioxide condensation stage is then connected to the first membrane separation stage (3) to receive the first permeate (5) as feed and provide a liquid condensate enriched in carbon dioxide and a mixture of non-condensed gases. The device then comprises a further recycle conduit (19) which is connected to the carbon dioxide condensation stage to receive the mixture of non-condensed gases and which is connected to a further recycle feed point (20) arranged between the gas compressor (1) and the first membrane separation stage (3). The carbon dioxide condensation stage comprises a carbon dioxide compressor (21) compressing the first permeate (5) to a pressure higher than the triple point pressure of carbon dioxide and a carbon dioxide condenser (22) where the compressed first permeate is cooled to condense the liquid condensate (17) enriched in carbon dioxide. In this embodiment, the hydrogen sulfide adsorber (14) is preferably arranged downstream of gas compressor (1), i.e. between gas compressor (1) and the first membrane separation stage (3), and the further recycle feed point (20) is arranged between the gas compressor (1) and the hydrogen sulfide adsorber (14). When the further recycle feed point (20) is arranged between the gas compressor (1) and the hydrogen sulfide adsorber (14), the further recycle conduit (19) is preferably connected to a second additional recycle feed point (23), arranged between the hydrogen sulfide adsorber (14) and the first membrane separation stage (3), and comprises at least one additional control valve (24) for controlling the fraction of recycled gas being passed to said further recycle feed point (20) and said second additional recycle feed point (23). The second additional recycle feed point (23) and control valve(s) (24) allow for adjusting the composition of the gas stream entering hydrogen sulfide adsorber (14) by changing the fraction of recycled gas which is passed to further recycle feed point (20) upstream of the adsorber. The device may then also comprise an oxygen concentration measurement and/or a measurement of relative humidity, as described above, between the further recycle feed point (20) and the hydrogen sulfide adsorber (14) or between the hydrogen sulfide adsorber (14) and the second additional recycle feed point (23).

In the process of the invention for separating methane from a gas mixture containing methane, carbon dioxide and hydrogen sulfide, the gas mixture is fed to the feed line of a device of the invention as described above and retentate is withdrawn from the second membrane separation stage as a product gas enriched in methane. The gas mixture is preferably a natural gas, a landfill gas or more preferably a biogas from an anaerobic digester.

The removal of hydrogen sulfide with a hydrogen sulfide adsorber, which comprises a bed of activated carbon having catalytic activity for oxidizing hydrogen sulfide with oxygen, requires oxygen to be present in the gas mixture entering the adsorber. A high rate of hydrogen sulfide removal and a high capacity of the adsorber are only achieved at oxygen concentrations in the gas which are considerably higher than usually present in a natural gas, a landfill gas or a biogas from an anaerobic digester and therefore oxygen has to be added upstream of the hydrogen sulfide adsorber, usually by introducing air. Furthermore, at these concentrations only part of the oxygen is consumed in the hydrogen sulfide adsorber. The process of the invention allows to reuse this non-converted oxygen for hydrogen sulfide removal by recycling it to a point upstream of the hydrogen sulfide adsorber, which reduces the amount of oxygen that has to be added for hydrogen sulfide removal and, if oxygen is added as air, also reduces the amount of nitrogen introduced, leading to a product gas enriched in methane having a lower nitrogen content. When the gas mixture is a biogas from an anaerobic digester, which is operated with controlled air addition to reduce hydrogen sulfide formation in the digester, the gas mixture may comprise sufficient oxygen to oxidize all the hydrogen sulfide and recycling oxygen in the process of the invention may provide an optimum oxygen concentration in the gas fed to the hydrogen sulfide adsorber without additional addition of air.

The process of the invention is preferably carried out in a device, where the recycle conduit is connected to two recycle feed points, one upstream of the hydrogen sulfide adsorber and one downstream of the hydrogen sulfide adsorber, as described above. The device then preferably comprises an oxygen concentration measurement between the recycle feed point and the hydrogen sulfide adsorber, either upstream or downstream of the hydrogen sulfide adsorber, and the fraction of recycled gas passed to the recycle feed point upstream of the hydrogen sulfide adsorber is controlled by at least one control valve and a controller to maintain the oxygen concentration in the gas fed to the hydrogen sulfide adsorber or in the gas leaving the hydrogen sulfide adsorber within a preset range. The oxygen concentration in the gas fed to the hydrogen sulfide adsorber is preferably maintained within a range of from 0.1 to 1.5% by volume, preferably from 0.3 to 1.0% by volume and most preferably 0.4 to 0.8% by volume, in order to achieve efficient removal of hydrogen sulfide and high capacity of the adsorber for hydrogen sulfide removal. The oxygen concentration in the gas fed to the hydrogen sulfide adsorber is preferably adjusted to provide at least 0.5 mol $O_2$—for each mol hydrogen sulfide contained in the gas stream to prevent excessive accumulation of hydrogen sulfide in the hydrogen sulfide adsorber.

Alternatively to an oxygen concentration measurement or in addition to it, the device may also comprise a measurement of relative humidity between the recycle feed point and the hydrogen sulfide adsorber, either upstream or downstream of the hydrogen sulfide adsorber, and the fraction of recycled gas passed to the recycle feed point upstream of the hydrogen sulfide adsorber is controlled by at least one control valve and a controller to maintain the relative humidity in the gas fed to the hydrogen sulfide adsorber or in the gas leaving the hydrogen sulfide adsorber within a preset range. The relative humidity is maintained within a range of from 25 to 95%, preferably from 30 to 90% and most preferably from 40 to 80%. This embodiment is particularly useful if the gas mixture containing methane, carbon dioxide and hydrogen sulfide is a landfill gas or a biogas having a high relative humidity of close to 100%. Such high humidity may lead to pore condensation in an activated carbon, which can decrease the efficiency of hydrogen sulfide adsorber (14) by impeding mass transport to the catalytically active sites of the activated carbon. Prior art processes therefore usually comprise a step of drying the gas mixture upstream of an adsorber containing activated carbon. With the process of the invention, it is sufficient to dry the gas mixture only after compression, where water removal by cooling and condensation is more effective and is useful to prevent condensation of water in one of the membrane separation stages. The recycle streams will then have a low water content and recycling all or a part of them upstream of the hydrogen sulfide adsorber (14) can reduce relative humidity of the gas entering the hydrogen sulfide adsorber to a value within the optimum range for efficient hydrogen sulfide removal without an extra step of dehumidifying gas upstream of the hydrogen sulfide adsorber.

In another preferred embodiment, the process of the invention is carried out in a device comprising a carbon dioxide condensation stage as described above and liquefied carbon dioxide is withdrawn as an additional product from the carbon dioxide condensation stage. The first permeate (5) is then preferably compressed with carbon dioxide compressor (21) to a pressure higher than the pressure provided on the downstream side of gas compressor (1), so carbon dioxide condenser (22) provides the mixture (18) of non-condensed gases at a pressure high enough to pass them to the first membrane separation stage (3) without additional compression. This embodiment preferably uses a device where the hydrogen sulfide adsorber (14) is arranged downstream of gas compressor (1) and the further recycle conduit (19) for recycling the mixture (18) of non-condensed gases is connected to two recycle feed points, one upstream of the hydrogen sulfide adsorber and one downstream of the hydrogen sulfide adsorber, as described further above. This embodiment requires less total membrane area and provides liquefied carbon dioxide as an extra product that can be marketed, but requires additional equipment and consumes more energy for gas compression.

EXAMPLES

Separation of biogas was calculated with a process simulation software based on experimentally determined membrane selectivities of commercial polyimide hollow fiber membrane modules SEPURAN® Green SC 3500.

Example 1

Separation of 310 $Nm^3/h$ of a biogas containing 56.3 vol-% methane, 39.0 vol-% carbon dioxide, 0.5 vol-% nitrogen, 0.5 vol-% oxygen and 3.7 vol-% water, having a relative humidity of 100%, was calculated for a three stage membrane separation in a device as shown in FIG. 1, with 10 membrane modules each in the first membrane separation stage (3) and the second membrane separation stage (6) and 11 membrane modules in the third membrane separation stage (9).

The feed to the first membrane separation stage (3) is compressed to 16.1 bar and dried and has a flow rate of 411.4 $Nm^3/h$, comprising 55.3 vol-% methane, 42.8 vol-% carbon dioxide, 0.56 vol-% nitrogen and 1.09 vol-% oxygen. The first membrane separation stage (3) separates this feed into 242 $Nm^3/h$ of a first retentate (4), obtained at 16.0 bar, containing 85.5 vol-% methane, 12.7 vol-% carbon dioxide, 0.8 vol-% nitrogen and 1.0 vol-% oxygen, and a first permeate (5), obtained at 3.1 bar, containing 12.1 vol-% methane, 85.9 vol-% carbon dioxide, 0.2 vol-% nitrogen and 1.25 vol-% oxygen. The second membrane separation stage (6) separates the first retentate (4) into 176 $Nm^3/h$ of a second retentate (7), obtained at 16.0 bar, containing 98.5 vol-% methane, 0.3 vol-% carbon dioxide, 0.9 vol-% nitrogen and 0.37 vol-% oxygen, which can be fed as biomethane to a gas distribution grid, and 66 $Nm^3/h$ of a second permeate (8), obtained at 0.9 bar, containing 51.0 vol-% methane, 45.7 vol-% carbon dioxide, 0.7 vol-% nitrogen and 2.6 vol-% oxygen, which is recycled. The third membrane separation stage (9) separates the first permeate (5) into 45.9 $Nm^3/h$ of a third retentate (10), obtained at 3.0 bar, containing 41.7 vol-% methane, 55.0 vol-% carbon dioxide, 0.6 vol-% nitrogen and 2.7 vol-% oxygen, which is recycled, and a third permeate (11), obtained at 1.1 bar, containing 1.1 vol-% methane, 97.5 vol-% carbon dioxide, less than 0.1 vol-% nitrogen and 0.7 vol-% oxygen, which can be discharged.

When all gas is recycled to recycle feed point (13) upstream of the hydrogen sulfide adsorber (14), the gas fed to hydrogen sulfide adsorber (14) contains 1.06% oxygen and has a relative humidity of 77%. The increase in oxygen content and reduction in relative humidity allows for operating the hydrogen sulfide adsorber (14) at high capacity and hydrogen sulfide removal without a need for drying the biogas feed stream.

Example 2

Separation of 479 $Nm^3/h$ of a biogas containing 45.9 vol-% methane, 47.0 vol-% carbon dioxide, 1.5 vol-% nitrogen, 0.2 vol-% oxygen and 5.4 vol-% water, having a relative humidity of 100%, was calculated for a two stage membrane separation in a device comprising an additional carbon dioxide condensation stage as shown in FIG. 2, with 12 membrane modules in the first membrane separation stage (3) and 27 membrane modules in the second membrane separation stage (6).

The biogas is combined with second permeate (8) and compressed with gas compressor (1) to 17.1 bar. This compressed gas stream is combined with the mixture of non-condensed gases (18) from carbon dioxide condenser (22) to give the feed stream to the first membrane separation stage (3). The first membrane separation stage (3) separates this feed into 383 Nm$^3$/h of a first retentate (4), obtained at 17.0 bar, containing 85.0 vol-% methane, 7.2 vol-% carbon dioxide, 3.4 vol-% nitrogen and 4.4 vol-% oxygen, and a first permeate (5), obtained at 1.05 bar, containing 6.3 vol-% methane, 88.8 vol-% carbon dioxide, 0.4 vol-% nitrogen and 4.0 vol-% oxygen. The second membrane separation stage (6) separates the first retentate (4) into 228 Nm$^3$/h of a second retentate (7), obtained at 17.0 bar, containing 96.4 vol-% methane, less than 0.1 vol-% carbon dioxide, 3.2 vol-% nitrogen and 0.4 vol-% oxygen, which can be fed as biomethane to a gas distribution grid, and 155 Nm$^3$/h of a second permeate (8), obtained at 0.9 bar, containing 68.1 vol-% methane, 17.8 vol-% carbon dioxide, 3.9 vol-% nitrogen and 10.3 vol-% oxygen, which is recycled. The first permeate (5) is compressed to 17.1 bar and passed to the carbon dioxide condenser (22) where liquid carbon dioxide is condensed at −20° C. 195.3 Nm$^3$/h of a mixture of non-condensed gases (18), containing 13.6 vol-% methane, 76.8 vol-% carbon dioxide, 0.9 vol-% nitrogen and 8.7 vol-% oxygen, is recycled from the carbon dioxide condenser (22).

When the mixture of non-condensed gases (18) is recycled to recycle feed point (23) downstream of the hydrogen sulfide adsorber (14), the gas fed to hydrogen sulfide adsorber (14) contains 2.7 vol-% oxygen. Therefore, an oxygen content sufficient for operating the hydrogen sulfide adsorber (14) at high capacity and hydrogen sulfide removal can already be achieved by recycling only the second permeate (8) to a recycle feed point (13) upstream of the hydrogen sulfide adsorber (14).

Example 3

Separation of 8265 Nm$^3$/h of a biogas containing 54.5 vol-% methane, 39.4 vol-% carbon dioxide, 2.5 vol-% nitrogen, 0.5 vol-% oxygen and 3.1 vol-% water, having a relative humidity of 100%, was calculated for a two stage membrane separation in a device as shown in FIG. 1 but without a third membrane separation stage (9) and with a blower in recycle conduit (12) providing a permeate pressure of 0.7 bar in the second membrane separation stage (6), having 91 membrane modules in the first membrane separation stage (3) and 336 membrane modules in the second membrane separation stage (6).

The feed to the first membrane separation stage (3) is compressed to 11.2 bar and dried and has a flow rate of 11914 Nm$^3$/h, comprising 44.2 vol-% methane, 52.5 vol-% carbon dioxide, 2.2 vol-% nitrogen and 0.8 vol-% oxygen. The first membrane separation stage (3) separates this feed into 8590 Nm$^3$/h of a first retentate (4), obtained at 11.0 bar, containing 60.2 vol-% methane, 35.8 vol-% carbon dioxide, 3.0 vol-% nitrogen and 1.0 vol-% oxygen, and a first permeate (5), obtained at 1.05 bar, containing 2.8 vol-% methane, 95.7 vol-% carbon dioxide, 0.2 vol-% nitrogen and 0.5 vol-% oxygen, which can be discharged. The second membrane separation stage (6) separates the first retentate (4) into 4715 Nm$^3$/h of a second retentate (7), obtained at 11.0 bar, containing 93.6 vol-% methane, 1.6 vol-% carbon dioxide, 4.2 vol-% nitrogen and 0.55 vol-% oxygen, which can be fed as biomethane to a gas distribution grid, and 3876 Nm$^3$/h of a second permeate (8), obtained at 0.7 bar, containing 19.6 vol-% methane, 77.3 vol-% carbon dioxide, 1.4 vol-% nitrogen and 1.5 vol-% oxygen, which is recycled.

When all gas is recycled to recycle feed point (13) upstream of the hydrogen sulfide adsorber (14), the gas fed to hydrogen sulfide adsorber (14) contains 0.8 vol-% oxygen and has a relative humidity of 69%. The increase in oxygen content and reduction in relative humidity allows for operating the hydrogen sulfide adsorber (14) at high capacity and hydrogen sulfide removal without a need for drying the biogas feed stream.

Example 4

The calculation of example 3 was repeated for separation of 6600 Nm$^3$/h of a biogas containing 51.4 vol-% methane, 43.5 vol-% carbon dioxide, 1.6 vol-% nitrogen, 0.4 vol-% oxygen and 3.1 vol-% water, having a relative humidity of 100%, in a device having 66 membrane modules in the first membrane separation stage (3) and 113 membrane modules in the second membrane separation stage (6).

The feed to the first membrane separation stage (3) is compressed to 19.6 bar and dried and has a flow rate of 7705 Nm$^3$/h, comprising 50.7 vol-% methane, 46.8 vol-% carbon dioxide, 1.7 vol-% nitrogen and 0.7 vol-% oxygen. The first membrane separation stage (3) separates this feed into 4675 Nm$^3$/h of a first retentate (4), obtained at 19.6 bar, containing 80.6 vol-% methane, 16.0 vol-% carbon dioxide, 2.6 vol-% nitrogen and 0.8 vol-% oxygen, and a first permeate (5), obtained at 1.05 bar, containing 4.6 vol-% methane, 94.3 vol-% carbon dioxide, 0.2 vol-% nitrogen and 0.5 vol-% oxygen, which can be discharged. The second membrane separation stage (6) separates the first retentate (4) into 3378 Nm$^3$/h of a second retentate (7), obtained at 19.5 bar, containing 96.4 vol-% methane, 0.4 vol-% carbon dioxide, 2.9 vol-% nitrogen and 0.3 vol-% oxygen, which can be fed as biomethane to a gas distribution grid, and 1296 Nm$^3$/h of a second permeate (8), obtained at 0.58 bar, containing 39.5 vol-% methane, 56.7 vol-% carbon dioxide, 1.9 vol-% nitrogen and 1.9 vol-% oxygen, which is recycled.

When all gas is recycled to recycle feed point (13) upstream of the hydrogen sulfide adsorber (14), the gas fed to hydrogen sulfide adsorber (14) contains 0.64 vol-% oxygen and has a relative humidity of 83%. The increase in oxygen content and reduction in relative humidity allows for operating the hydrogen sulfide adsorber (14) at high capacity and hydrogen sulfide removal without a need for drying the biogas feed stream.

LIST OF REFERENCE SIGNS

1 Gas compressor
2 Feed line
3 First membrane separation stage
4 First retentate
5 First permeate
6 Second membrane separation stage
7 Second retentate
8 Second permeate
9 Third membrane separation stage
10 Third retentate
11 Third permeate
12 Recycle conduit
13 Recycle feed point
14 Hydrogen sulfide adsorber 15 Additional recycle feed point
16 Control valve
17 Liquid condensate
18 Mixture of non-condensed gases
19 Further recycle conduit
20 Further recycle feed point
21 Carbon dioxide compressor
22 Carbon dioxide condenser
23 Second additional recycle feed point
24 Control valve

The invention claimed is:

1. A device for separating methane from a gas mixture containing methane, carbon dioxide and hydrogen sulfide, comprising:
   a) a gas compressor;
   b) a feed line for feeding said gas mixture to said gas compressor;
   c) a first membrane separation stage downstream from said gas compressor, comprising a gas separation membrane having higher permeability for carbon dioxide than for methane, providing a first retentate and a first permeate;
   d) a second membrane separation stage, connected to said first membrane separation stage to receive the first retentate as feed, said second membrane separation stage comprising a gas separation membrane having higher permeability for carbon dioxide than for methane, providing a second retentate as a product gas enriched in methane and a second permeate;
   e) optionally a third membrane separation stage, connected to said first membrane separation stage to receive the first permeate as feed, said third membrane separation stage comprising a gas separation membrane having higher permeability for carbon dioxide than for methane, providing a third retentate and a third permeate;
   f) a recycle conduit connected to a recycle feed point on said feed line upstream from said gas compressor, wherein:
      i) said recycle conduit is connected to said second membrane separation stage to receive said second permeate; or,
      ii) if the optional third membrane separation stage is present, either:
         said recycle conduit is connected to said third membrane separation stage to receive said third retentate; or alternatively,
         said recycle conduit is connected to both said second membrane separation stage and said third membrane separation stage to receive said second permeate and said third retentate; and
   g) at least one hydrogen sulfide adsorber comprising a bed of activated carbon having catalytic activity for oxidizing hydrogen sulfide with oxygen, said hydrogen sulfide adsorber being arranged between said recycle feed point and said first membrane separation stage.

2. The device of claim 1, wherein said hydrogen sulfide adsorber is arranged between said recycle feed point and said gas compressor.

3. The device of claim 2, wherein said recycle conduit comprises an additional connection to an additional recycle feed point located between said hydrogen sulfide adsorber and said gas compressor, and to at least one control valve for controlling the fraction of recycled gas passed to said recycle feed point and said additional recycle feed point.

4. The device of claim 3, further comprising an oxygen concentration measurement device on said feed line between the recycle feed point and the hydrogen sulfide adsorber or between the hydrogen sulfide adsorber and the additional recycle feed point, and a controller configured to operate said control valve to maintain the oxygen concentration within a preset range.

5. The device of claim 3, comprising a measurement device for relative humidity on said feed line between the recycle feed point and the hydrogen sulfide adsorber or between the hydrogen sulfide adsorber and the additional recycle feed point, and a controller configured to operate said control valve to maintain the relative humidity within a preset range.

6. The device of claim 5, comprising;
   a) a carbon dioxide condensation stage instead of the optional third membrane separation stage, said carbon dioxide condensation stage being connected to said first membrane separation stage to receive the first permeate as feed and providing a liquid condensate enriched in carbon dioxide and a mixture of non-condensed gases; and
   b) a further recycle conduit connected to a further recycle feed point between said gas compressor and said first membrane separation stage, the further recycle conduit being connected to said carbon dioxide condensation stage to receive said mixture of non-condensed gases.

7. The device of claim 1, comprising;
   a) a carbon dioxide condensation stage instead of the optional third membrane separation stage, said carbon dioxide condensation stage being connected to said first membrane separation stage to receive the first permeate as feed and providing a liquid condensate enriched in carbon dioxide and a mixture of non-condensed gases; and
   b) a further recycle conduit connected to a further recycle feed point between said gas compressor and said first membrane separation stage, the further recycle conduit being connected to said carbon dioxide condensation stage to receive said mixture of non-condensed gases.

8. The device of claim 1, wherein said hydrogen sulfide adsorber comprises activated carbon doped or impregnated with iodine, an iodide salt or an iodine precursor.

9. The device of claim 1, wherein said hydrogen sulfide adsorber comprises activated carbon doped or impregnated with a basic compound selected from the group consisting of: alkali metal hydroxides; alkali metal carbonates; alkaline earth metal oxides; and alkaline earth metal carbonates.

10. The device of claim 9, wherein said membrane separation stages comprise polyimide hollow fiber membranes.

11. The device of claim 1, wherein said membrane separation stages comprise polyimide hollow fiber membranes.

12. A process for separating methane from a gas mixture containing methane, carbon dioxide and hydrogen sulfide, comprising feeding said gas mixture to the feed line of the device of claim 1, and withdrawing retentate from the second membrane separation stage as a product gas enriched in methane.

13. The process of claim 12, wherein said gas mixture is fed to the feed line of the device and wherein the fraction of gas recycled to the recycle feed point is controlled to maintain the oxygen concentration in the gas fed to the hydrogen sulfide adsorber or in the gas leaving the hydrogen sulfide adsorber within a preset range, and wherein:
   a) the hydrogen sulfide adsorber in said device is arranged between the recycle feed point and said gas compressor;

b) the recycle conduit in said device comprises an additional connection to an additional recycle feed point located between said hydrogen sulfide adsorber and said gas compressor, and to at least one control valve for controlling the fraction of recycled gas passed to said recycle feed point and said additional recycle feed point;

c) the device further comprises an oxygen concentration measurement device on the feed line between the recycle feed point and the hydrogen sulfide adsorber or between the hydrogen sulfide adsorber and the additional recycle feed point; and a controller configured to operate the control valve to maintain the oxygen concentration within a preset range.

14. The process of claim 13, wherein the oxygen concentration in the gas fed to the hydrogen sulfide adsorber is maintained within a range of from 0.1 to 1.5% by volume.

15. The process of claim 13, wherein the oxygen concentration in the gas fed to the hydrogen sulfide adsorber is maintained within a range of from 0.4 to 0.8% by volume.

16. The process of claim 12, wherein said gas mixture is fed to the feed line of the device and wherein the fraction of gas recycled to the recycle feed point is controlled to maintain the relative humidity in the gas fed to the hydrogen sulfide adsorber or in the gas leaving the hydrogen sulfide adsorber within a preset range, and wherein:

a) the hydrogen sulfide adsorber in said device is arranged between the recycle feed point and said gas compressor;

b) the recycle conduit in said device comprises an additional connection to an additional recycle feed point located between said hydrogen sulfide adsorber and said gas compressor, and to at least one control valve for controlling the fraction of recycled gas passed to said recycle feed point and said additional recycle feed point;

c) the device comprises a measurement device for relative humidity on said feed line between the recycle feed point and the hydrogen sulfide adsorber or between the hydrogen sulfide adsorber and the additional recycle feed point, and a controller configured to operate said control valve to maintain the relative humidity within a preset range.

17. The process of claim 16, wherein the relative humidity is maintained within a range of from 25 to 95%.

18. The process of claim 16, wherein the relative humidity is maintained within a range of from 40-80%.

19. The process of claim 12, wherein said gas mixture is fed to the feed line of said device wherein liquefied carbon dioxide is withdrawn as an additional product and wherein the device comprises;

a) a carbon dioxide condensation stage instead of the optional third membrane separation stage, said carbon dioxide condensation stage being connected to said first membrane separation stage to receive the first permeate as feed and providing a liquid condensate enriched in carbon dioxide and a mixture of non-condensed gases; and b) a further recycle conduit connected to a further recycle feed point between said gas compressor and said first membrane separation stage, the further recycle conduit being connected to said carbon dioxide condensation stage to receive said mixture of non-condensed gases.

20. The process of claim 12, wherein said gas mixture is a biogas from an anaerobic digester.

* * * * *